United States Patent [19]

Sakoe

[11] 4,403,114
[45] Sep. 6, 1983

[54] SPEAKER RECOGNIZER IN WHICH A SIGNIFICANT PART OF A PRESELECTED ONE OF INPUT AND REFERENCE PATTERNS IS PATTERN MATCHED TO A TIME NORMALIZED PART OF THE OTHER

[75] Inventor: Hiroaki Sakoe, Tokyo, Japan

[73] Assignee: Nippon Electric Co., Ltd., Tokyo, Japan

[21] Appl. No.: 279,277

[22] Filed: Jun. 30, 1981

[30] Foreign Application Priority Data

Jul. 15, 1980 [JP] Japan .................................. 55-96712

[51] Int. Cl.³ ............................................... G10L 1/00
[52] U.S. Cl. ................................. 179/1.5 D; 364/513
[58] Field of Search ............. 179/1.5 B, 1.5 C, 1.5 D; 340/146.3 A, 146.3 FT, 146.3 WD; 364/513

[56] References Cited

U.S. PATENT DOCUMENTS 3,582,559  6/1971  Hitchcock ........................ 179/1.5 B
4,256,924  3/1981  Sakoe ............................... 179/1.5 D
4,319,085  3/1982  Welch et al. ..................... 179/1.5 B

*Primary Examiner*—Emanuel S. Kemeny
*Attorney, Agent, or Firm*—Sughrue, Mion, Zinn, Macpeak and Seas

[57] ABSTRACT

Speaker recognition is decided by a similarity measure (D) calculated from comparing selected feature vectors among an input speech signal sequence of feature vectors (A) and a selected sequence (B) of reference vectors selected from a plurality of pre-stored reference sequences. Prior to comparison of the input and reference vector sequences, the two sequences are time normalized to align corresponding feature vectors. A significant sound specifying signal (V) including a time sequence of elementary signals is generated in synchronism with one of the input and reference sequences and indicates which feature vectors in that one of the input and reference sequences are considered to represent significant sound. The similarity measure (D) is then calculated in accordance with the comparison of those feature vectors in the one sequence which are indicated by the significant sound specifying signal as representing significant sound and the corresponding feature vectors of the other sequence.

4 Claims, 3 Drawing Figures

SPEAKER RECOGNIZER IN WHICH A SIGNIFICANT PART OF A PRESELECTED ONE OF INPUT AND REFERENCE PATTERNS IS PATTERN MATCHED TO A TIME NORMALIZED PART OF THE OTHER

BACKGROUND OF THE INVENTION

This invention relates to a speaker recognizing or discriminating system, which may be any one of a speaker verifying, a speaker identifying, and a speaker classifying system. More particularly, this invention relates to a speaker recognizing system in which pattern matching is carried out by resorting to a dynamic programming algorithm.

An article was contributed by Aaron E. Rosenberg to Proceedings of the IEEE, Vol. 64, pages 475-487 (April 1976), and entitled "Automatic Speaker Verification: A Review." In the article, various speaker verification systems are reviewed. An electronic digital computer is used in a Texas Instrument entry control system. A dynamic programming technique is resorted to in a Bell Labs automatic speaker vertification system on establishing a warping function for use in carrying out time registration between an input speech pattern and a reference speech pattern. The time normalization, also called time normalization or alignment in the art, is carried out by using speech or phonetic events, such as an intensity contour, in each of the input and the reference speech patterns. Besides notes on speaker identification, various fields of application are described as, for example, banking and credit authorizations, entry controls, and transactions from remote locations. The article furthermore shows a number of reference articles.

On the other hand, specific speech recognition systems for automatically recognizing continuously spoken words are revealed in U.S. Pat. No. 3,816,722 issued to the present applicant et al and assigned to the present assignee, and Nos. 4,059,725 and 4,049,913, both issued to the present applicant and assigned also to the instant assignee. Papers were contributed by the applicants, either jointly or singly, to IEEE Transactions and others as regards such speech recognition systems. The fact that none of the papers is listed in the bibliography of the Rosenberg article, would prove it insurmountably difficult to apply the speech recognition systems to speaker recognition.

In each of the speech recognition systems disclosed in the patents, an input speech sound or pattern is converted to a time sequence of feature vectors representative of the input speech sound. A plurality of feature vector sequences are preliminarily stored in the system to represent reference speech sounds. Each feature vector sequence corresponds to a set of filter bank output samples described in the Rosenberg article. According to the patents, the feature vector sequence is dealt with as it stands, rather than after being subjected to segmentation, as called by Rosenberg, prior to analysis. More specifically, similarity measures are calculated between the input feature vector sequence and the reference feature vector sequences according to the dynamic programming technique. In other words, pattern matching is carried out between an input speech pattern and reference speech patterns by resorting to a dynamic programming algorithm. The time normalization is simultaneously carried out without utilizing the speech events of the type described in the Rosenberg article. Inasmuch as the speech recognition systems are already in practical use and have proven to be excellently operable, it is desirable to develop a speaker recognizing system without much modifying the speech recognition system.

SUMMARY OF THE INVENTION

It is therefore a principal object of the present invention to provide a speaker recognition system operable in principle like a speech recognition system of the type revealed in U.S. Pat. Nos. 3,816,722, 4,059,725, and 4,049,913 referred to hereinabove.

It is a subordinate object of this invention to provide a speaker recognition system of the type described, which is operable as a speaker verifying system.

It is another subordinate object of this invention to provide a speaker recognizing system of the type described, which serves either as a speaker identifying system or a speaker classifying system.

According to the present invention, an input time sequence of feature vectors is generated in response to an input speech signal, and a specific time sequence of feature vectors representing a specific speaker is generated from a plurality of stored feature vector sequences. A significant sound signal including a time sequence of elementary signals is produced in synchronism with the feature vectors of either the input time sequence or the specific time sequence and indicates which feature vectors of that sequence are considered to represent significant sound. The input and specific time sequences are time normalized to determine corresponding parts of the input and specific time sequences, and a similarity measure is calculated based upon a comparison between the feature vectors of one of the sequences which are indicated by the significant sound signal as being significant and the corresponding feature vectors of the other time sequence.

According to this invention, a speaker recognizing system comprises input time sequence producing means, specific time sequence producing means, significant sound specifying means, time normalizing means, similarity measure calculating means, and recognizing means. The input time sequence producing means is responsive to an input speech sound spoken by a speaker to be recognized for producing an input time sequence of feature vectors representative of the input speech sound. The input time sequence comprises a first sequence of feature vectors representative of a significant sound in the input speech sound. The specific time sequence producing means is for producing a specific time sequence of feature vectors representative of a specific speech sound spoken by a specific speaker. The specific time sequence comprises a second sequence of feature vectors representative of a significant sound in the specific speech sound. The significant sound specifying means is for producing a single significant sound specifying signal in synchronism with a preselected one of the first and the second sequences. The time normalizing means is for time normalizing the input and the specific time sequences relative to each other to derive first and second normalized time sequences of feature vectors from the input and the specific time sequences, respectively, and to produce the first and the second normalized time sequences. The similarity measure calculating means is responsive to the single significant sound specifying signal and the first and the second normalized time sequences for calculating a similarity measure between those first and second trains of feature vectors which are selected from the first and the second normalized time sequences in compliance with the single significant sound specifying signal, respectively. The similarity measure calculating means produces a similarity measure signal representative of the calculated similarity measure. The recognizing means is responsive to the similarity measure signal for recognizing whether or not the speaker to be recognized is the specific speaker.

According to an embodiment of this invention, the specific time sequence is selected one at a time from a plurality of reference or stored sequences of feature vectors representative of reference speech sounds spoken by a plurality of registered speakers. When the speaker to be recognized selects one of the stored sequences as the specific time sequence that represents his own speech sound, the speaker recognizing system serves as a speaker verifying system. When the stored sequences are successively selected as the specific time sequence, the speaker recognizing system is operable either as a speaker identifying system or a speaker classifying system.

It is possible to use a voiced part of entirety of the speech sound as the significant sound. The fact that the voiced vowels (voiceless vowels being not seldom in Japanese, even in formally spoken words) and consonants are more informative of the speakers is already known as described, for example, by G. S. Ramishvili in Engineering Cybernetics, an English edition of "Техническа Кибернетика," September–October 1966 (No. 5), pages 84–89, under the title of "Automatic Voice Recognition." It has now been confirmed by the present applicant that the similarity measure calculated between the above-specified first and second trains, carries excellent information as regards the individual speakers.

Automatic discrimination between voiced and voiceless sounds is also known as described in an article contributed by Bishnu S. Atal et al to IEEE Transactions on Acoustics, Speech, and Signal Processing, Vol. ASSP-24, No. 3 (June 1976), pages 201–212, under the title of "A Pattern Recognition Approach to Voiced-Unvoiced-Silence Classification with Applications to Speech Recognition." Intricate implementation is, however, necessary at present on automatically discriminating voiced sounds from voiceless sounds. The result of discrimination may often include errors. The above-recited significant sound specifying means is therefore for producing a single significant sound specifying signal which specifies the significant sound in only one of the input and the specific speech sounds.

The time normalization is carried out separately of calculation of the similarity measure. Unlike the above-cited description in the Rosenberg article, the time normalization is carried out directly for the input and the specific time sequences, rather than by using the speech events in the respective sequences. The similarity measure is subsequently calculated between the first and the second trains of feature vectors selected from the above-specified first and second normalized time sequences by the use of the single significant sound specifying signal. As discussed in the above-referenced patents as regards pattern matching, a dynamic programming technique should be resorted to on carrying out time normalization. In this sense, it is possible to understand that a speaker recognizing system according to this invention, carries out pattern matching by resorting to a dynamic programming algorithm.

Segmentation, as called in the three patents referenced above, is skilfully carried out in the system disclosed in U.S. Pat. Nos. 4,059,725 and 4,049,913 among the three patents. Segmentation is also skilfully carried out in U.S. Pat. No. 4,286,115 issued to the present applicant and assigned to the present assignee. Inasmuch as it is possible to make each of the input and the specific time sequences represent a continuously spoken word sequence in a speaker recognizing system, it is unnecessary in general to resort to the segmentation scheme although the scheme may be applied to the speaker recognizing system, if desired.

DESCRIPTION OF THE PREFERRED EMBODIMENTS

Figure 1:
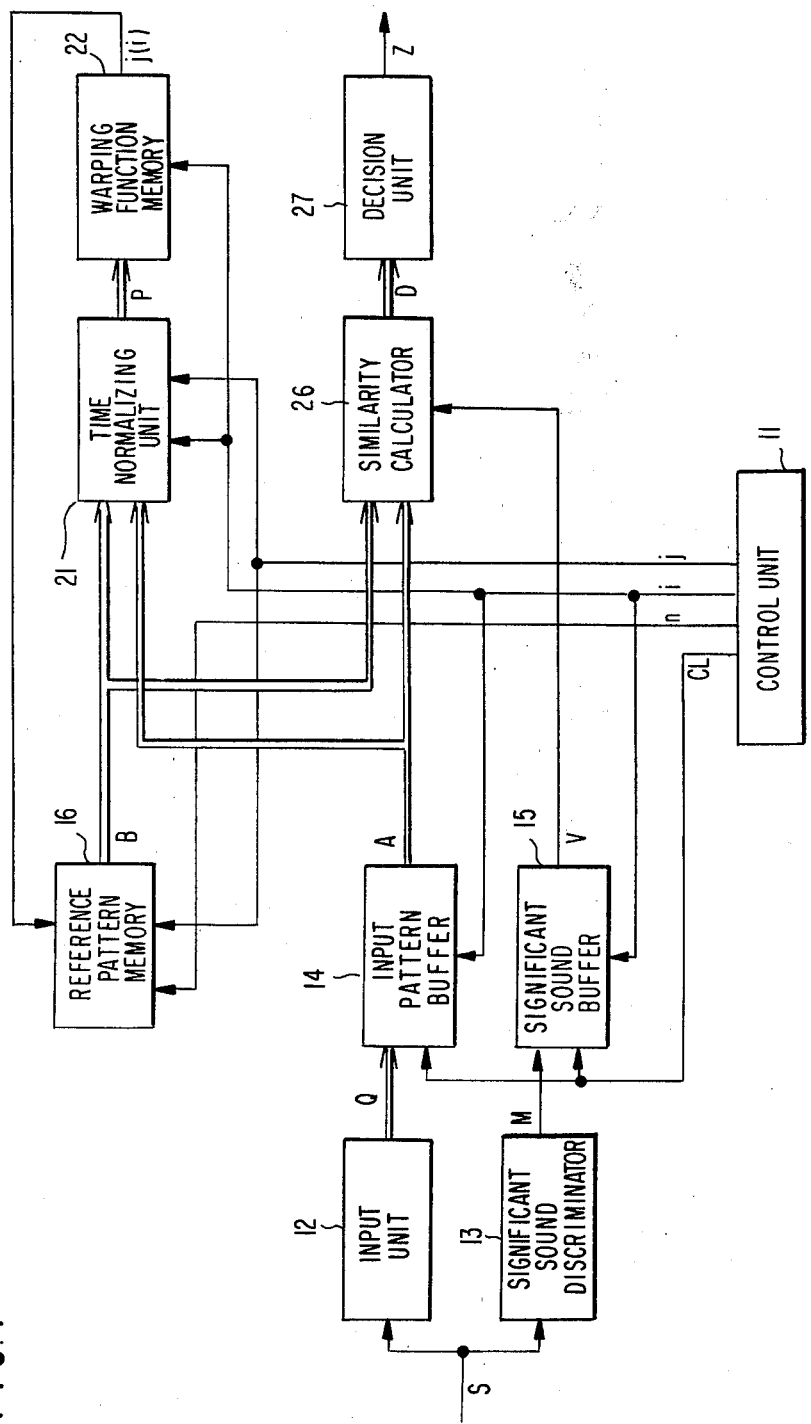
FIG. 1 is a block diagram of a speaker recognizing system according to a first embodiment of the instant invention.
Figure 2:
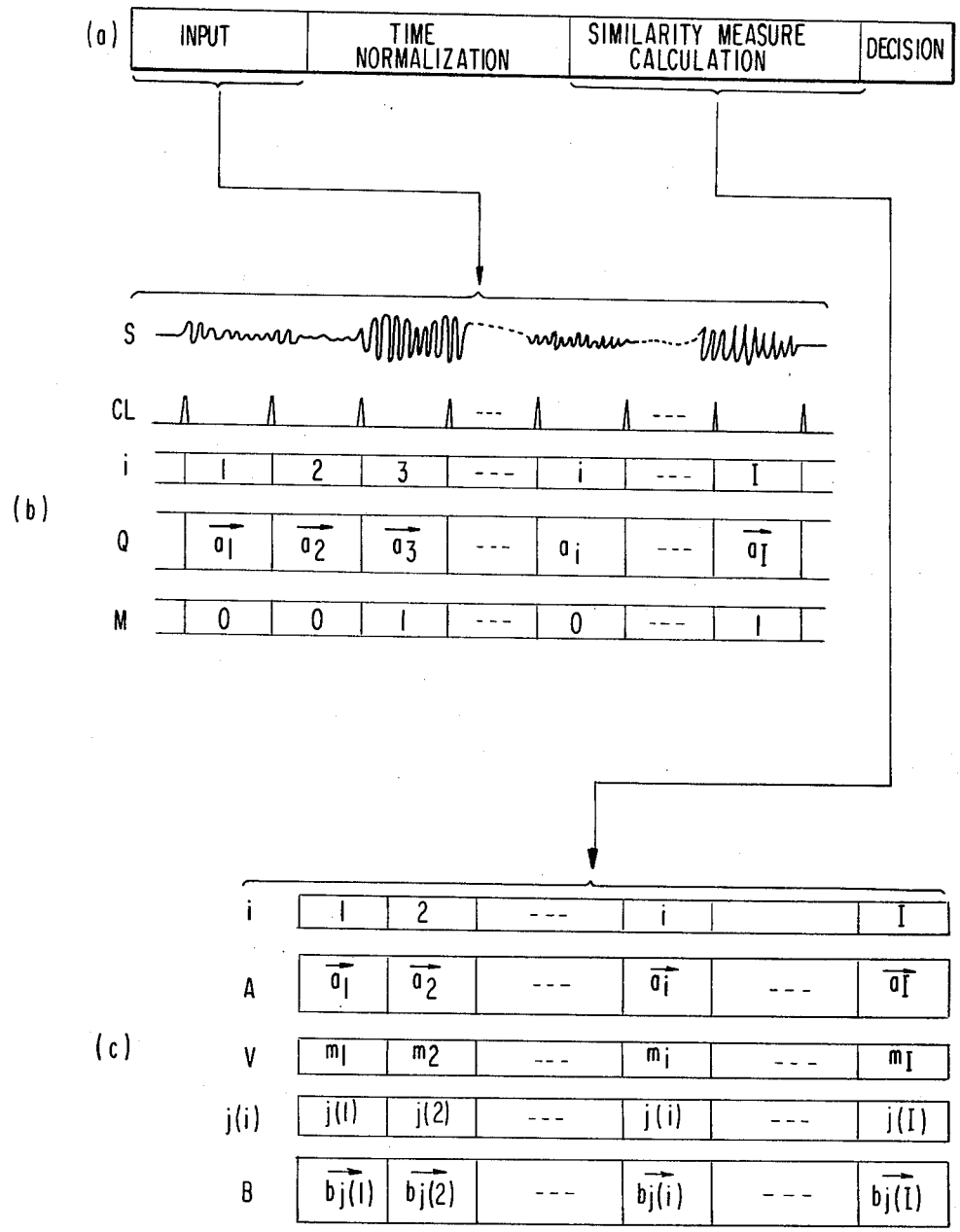
FIG. 2 shows a few schematic time charts for use in describing the operation of the system depicted in FIG. 1.

Referring to FIGS. 1 and 2, a speaker recognizing system according to a first embodiment of the present invention comprises a control unit 11 for producing various control pulses and signals to control other units and elements of the system. The control pulses and signals will become clear as the description proceeds. Let it be mentioned for the time being that the control unit 11 defines an input interval of time, a time normalizing interval, a similarity measure calculating interval, and a decision interval depicted in FIG. 2 at (a).

In the input interval detailed in FIG. 2 at (b), an input speech sound spoken by a speaker to be recognized is supplied to an input unit 12 through a signal lead S as an input electrical signal S schematically illustrated in FIG. 2 at (b) as an input pattern. The input unit 12 is similar to that described in U.S. Pat. No. 4,049,913 referenced heretobefore and may be a speech analyser of the type described in an article contributed by S. K. Das et al to IEEE Transactions on Audio and Electroacoustics, Vol. AU-19, pages 32–43 (March 1971), and entitled "A Scheme for Speech Processing in Automatic Speaker Verification" (in particular, FIG. 2 of the article). Like the input electrical signal S and the signal lead S therefor, the signal and the signal lead therefor will often be designated by the same reference symbol in the following.

Responsive to the start of the input electrical signal S, the control unit 11 produces a sequence of clocks CL at a clock period of about 10 milliseconds. The control unit 11 produces also a first address signal i reset to indicate unity at the beginning of the input electrical signal S and then consecutively increased in synchronism with the clocks CL until the end of the input electrical signal S, when the address signal i indicates a first final count I representative of a duration I of the input speech sound in terms of the clock period.

Supplied with the clocks CL through a signal lead (not shown), the input unit 12 supplies a signal lead Q with a time sequence A of feature vectors $a_i$'s, herein called an input time sequence, representative of the input speech sound. More specifically, the input unit 12 frequency analyses the input electrical signal S into a plurality of frequency analysed signals, samples the frequency analysed signals by the clocks CL into successive sets of samples, and digitizes each set of samples into an i-th feature vector $\vec{a}_i$ when the clocks CL are indicative of an instant at which the address signal i indicates an i-th count i. Merely for simplicity of denotation, such vectors will be designated throughout the following by usual letters, as a, by omitting the arrow placed above such a letter to indicate a vector.

The input electrical signal S is supplied also to a significant sound discriminating unit 13, which may be implemented by a microprocessor so as to be operable as described in the above-cited Atal et al article in discriminating voiced sounds in the input speech sound as significant or meaningful sounds from voiceless sounds. Supplied with the clocks CL through a signal lead (not shown), the significant sound discriminating unit 13 supplies a signal lead M with a significant sound specifying signal M, or sound nature signals, specifying an interval of time in which the input speech sound comprises a significant sound. The detection of significant sound in the input speech does not mean merely the detection of the presence or absence of a word. As used throughout this specification and in the appended claims, the term "significant sound specifying signal" or "sound nature signal" designates a signal representing not the presence or absence of words but rather significant portions of words or utterances. As exemplified in FIG. 2 at (b), the significant sound specifying signal M may be a time sequence of elementary signals $m_i$'s given values of 1 and 0, such as a logic one and a logic zero level, when the feature vectors $a_i$'s related thereto by the clocks CL are representative of voiced and voiceless sounds, respectively.

In the example illustrated in FIG. 2 at (b), the input speech sound comprises at least two voiced sounds represented by the third and the I-th feature vectors $a_3$ and $a_I$. During the intervals in which the input unit 12 produces such feature vectors, the significant sound discriminating unit 13 gives the value 1 to the elementary signals, such as $m_3$ and $m_I$.

Each of an input pattern buffer 14 and a significant sound specifying buffer 15 has a plurality of addresses accessible by the address signal i. Responsive to the clocks CL serving as a write signal and to the address signal i, the input pattern buffer 14 and the significant sound specifying buffer 15 are loaded with the input time sequence A and the significant sound specifying signal M.

In the time normalizing interval to be later detailed, the address signal i is again made to indicate unity and is then consecutively increased to count up to the final count I. The input pattern buffer 14 and the significant sound specifying buffer 15 supply signal leads A and V with the input time sequence A and the significant sound specifying signal M as:

$$A = a_1, a_2, \ldots, a_i, \ldots, a_I$$

and $$M = m_1, m_2, \ldots, m_i, \ldots, m_I.$$

It is now understood that the control unit 11, the input unit 12, and the input pattern buffer 14 are operable in response to an input speech sound spoken by a speaker to be recognized, in producing an input time sequence A of feature vectors $a_i$'s representative of the input speech sound. The input time sequence A comprises a first sequence of feature vectors, such as $a_3$ or $a_I$ described above, representative of a significant sound in the input speech sound. A time sequence of elementary signals $m_i$'s having the value 1 is herein named a single significant sound specifying signal. Controlled by the first address signal i, the significant sound specifying buffer 15 produces the single significant sound specifying signal in synchronism with the first sequence. Being produced in synchronism with the first sequence, a plurality of "single" significant sound specifying signals are successively produced when the input speech sound comprises a plurality of significant sounds separated from each other by a non-significant sound, such as a voiceless sound. The word "single" is herein used to mean that the significant sound specifying signal in question is produced in response to only one of the input and the specific speech sounds as remarked hereinabove. In the time normalizing interval, the first address signal i may or may not be produced in synchronism with the clocks CL.

It should be noted in connection with the above that the signal produced from the significant sound specifying buffer 15 onto the signal lead V is not different in format from the significant sound specifying signal M. In other words, the signal on the lead V comprises elementary signals $m_1, m_2, \ldots,$ and $m_I$. The single significant sound specifying signal is mentioned above merely for convenience in later describing calculation of a modified overall distance D' (A, B).

It should also be noted that the significant sound has a predetermined nature informative of the speaker to be recognized. The significant sound specifying signal and the single significant sound specifying signal are called a sound nature signal and a significant sound signal, respectively, depending on the circumstances. Timed by the clocks CL, the significant sound discriminator 13 and the significant sound specifying buffer 15 are operable in response to the input speech sound to produce a sound nature signal which comprises a significant sound sigal specifying the significant sound.

A reference pattern memory 16 has a plurality of memory sectors, each having a plurality of addresses accessible by a second address signal j produced by the control unit 11 as will presently be described and will later be described again. The memory sectors are for a plurality of sequences $B^n$'s of feature vectors $b_j^n$'s representative of reference speech sounds n's spoken by a plurality of registered speakers. In a simplest case, the reference speech sounds n's are spoken by the respective registered speakers. At any rate, the feature vector sequences $B^n$'s are herein referred to as registered sequences and have durations $J^n$'s as measured by clocks used in sampling the respective reference speech sounds n's. Responsive to a reference speech sound specifying signal n (the same reference letter being used), one of the registered sequences $B^n$'s is selected as a specific sequence B of feature vectors $b_j$'s representative of a specific speech sound spoken by a specific speaker. Alternatively, the registered sequences $B^n$'s are successively selected one at a time as the specific sequence B.

In the illustrated example, the reference speech sound specifying signal n is produced by the control unit 11 and supplied to the reference pattern memory 16 through a signal lead n. It is readily possible to make the control unit 11 produce such a signal in the manner described in the above-referenced U.S. Pat. No.

4,049,913 in conjunction with a digit number specifier therein used.

As will later be described in connection with FIG. 3, it is possible, while the reference speech sound specifying signal n specifies a specific speech sound, to make the second address signal j indicate consecutive counts increased from unity in synchronism with certain clocks, such as the clocks CL, up to a second final count J representative of a duration J of the specific sequence B. The reference pattern memory 16, when supplied with the reference speech sound specifying signal n and the consecutively increased second address signal j, serves to produce a specific time sequence B of feature vectors $b_j$'s as:

$$B = b_1, b_2, \ldots, b_j, \ldots, b_J.$$

The specific time sequence B comprises a second sequence of feature vectors representative of a significant sound in the specific speech sound. Each of the registered sequences $B^n$'s comprises a reference sequence of feature vectors representative of a significant sound in one of the reference speech sounds n's that is represented by the registered sequence under consideration. The second sequence is that reference sequence of the selected one of the registered sequences $B^n$'s which is time sequentially produced in response to the second address signal j.

In the time normalizing interval depicted in FIG. 2 at (a), a time normalizing unit 21 is put into operation by the first and the second address signals i and j produced while a specific time sequence B is selected by the reference speech sound specifying signal n. The first address signal i scales a first time axis i for the input time sequence A and the second address signal j, a second time axis j for the specific time sequence B. The time normalization is for establishing a warping or mapping function:

$$j = j(i),$$

for warping or mapping the second time axis j to the first time axis i. In other words, the feature vectors $b_j$'s of the specific time sequence B are mapped to the feature vectors $a_i$'s of the input time sequence A by the warping function. The second address signal j should therefore be varied in a staggering or zigzag fashion preferably in an adjustment window, known in the art, while the first address signal i indicates the consecutively increasing counts i's. The mapping is such that a sum of an elementary distance d(i, j(i)) between each feature vector $a_i$ of the input time sequence A and a feature vector $b_{j(i)}$ *selected from the specific time sequence B so as to be mapped to the feature vector $a_i$* under consideration, is minimized. That is, the warping function is established by solving a minimization problem for defining an overall distance D(A, B) between an input pattern defined by the input time sequence A and a reference pattern given by the specific time sequence B as:

$$D(A, B) = \min_{j(i)} \left[ \sum_{i=1}^{I} d(i, j(i)) \right],$$

where the elementary distance d(i, j(i)) may be the Euclidean distance $|a_i - b_{j(i)}|$.

The minimization problem is efficiently solved by resorting to the dynamic programming technique disclosed in an article contributed by Hiroaki Sakoe, the present applicant, et al to IEEE Transactions on Acoustics, Speech, and Signal Processing, Vol. ASSP-26 No. 1 (February 1978), pages 43–49, under the title of "Dynamic Programming Algorithm Optimization for Spoken Word Recognition." By way of example, the minimization is carried out by calculating a recurrence formula:

$$g(i,j) = d(i,j) + \min \left[ \begin{array}{c} g(i-1,j) \\ g(i-1,j-1) \\ g(i-1,j-2) \end{array} \right].$$

The flow chart shown in FIG. 4 of the Sakoe et al article is applicable to calculation of the recurrence formula. For use in calculating such a recurrence formula, consecutive feature vectors $a_i$'s of the input time sequence A is supplied from the input pattern buffer 14 to the time normalizing unit 21 through the signal lead A. Those feature vectors $b_j$'s of the specific time sequence B which are selected by the staggering second address signal j are supplied from the reference pattern memory 16 to the time normalizing unit 21 through a signal lead B. The initial condition is given by g(1, 1) = d(1,1) for i = 1 and j = 1.

In order to establish the warping function rather than to calculate the overall distance D(A, B), the dynamic programming algorithm is expanded to calculation of a pointer p(i, j) selectively given values 0, 1 and 2 when the minimum in the recurrence formula is given by g(i−1, j) or g(i−1, j−0), g(i−1, j−1), and g(i−1, j−2), respectively, for each count of the first address signal i.

A pointer table, included in the time normalizing unit 21, has addresses two-dimensionally accessible by the first and the second address signals i and j. The pointer p(i, j) calculated for each count of the first address signal i and a particular count of the second address signal j, is stored in an address (i, j) accessed by the first and the second address signals i and j indicative of these counts.

As soon as the recurrence formula is calculated up to the first final count I, the value of the warping function j(I) becomes equal to the second final count J. One of the values 0, 1 and 2 is stored in the address (I, J) as a pointer p(I, J) or p(I, j(I)). The warping function is now defined by abscissae i's and ordinates j(i)'s, among which the ordinates j(i)'s are iteratively given by:

$$j(i-1) = j(i) - p(i, j(i)),$$

starting at i = I and j(I) = J and reversedly proceeding down to i = 1. The time normalizing unit 21 is now readily implemented by a microprocessor. Specific values along the first and the second time axes i and j are called the abscissae i's and the ordinates j(i)'s merely for convenience.

A warping function memory 22 has addresses accessible by the first address signal i. The ordinates j(i)'s obtained from the pointer table as above, are stored through a signal lead P in the respective addresses i = 1, 2, ..., i, ..., I as:

$$j(1), j(2), \ldots j(i), \ldots, j(I).$$

In the similarity measure calculating interval illustrated in FIG. 2 at (a) and detailed in FIG. 2 at (c), the first address signal i is consecutively varied once again to indicate from unity up to the first final count I. The input pattern buffer 14 supplies a similarity measure calculating unit 26 with the consecutive feature vectors $a_i$'s of the input time sequence A through the signal lead A. The significant sound specifying buffer 15 delivers the significant sound specifying signal M to the similarity measure calculating unit 26 through the signal lead V. The elementary signals $m_i$'s numbered from unit up to the first final count I are produced in synchronism with the correspondingly numbered feature vectors $a_i$'s. The warping function memory 22 delivers the ordinates j(i)'s to the reference pattern memory 16 through a signal lead j(i). The ordinates j(i)'s are used in accessing, in place of the second address signal j, the addresses of the memory sector for the specific time sequence B. Through the signal lead B, the reference pattern memory 16 supplies the similarity measure calculating unit 26 with selected feature vectors $b_{j(i)}$'s of the specific time sequence B. When the significant sound specifying signal M has the value $m_i=1$, the similarity measure calculating unit 26 calculates the elementary distance d(i,j(i)) between each feature vector $a_i$ and the feature vector $b_{j(i)}$ selected so as to be mapped thereto, and $m_i=0$, the elementary distance is not calculated. The similarity measure calculating unit 26 has a register for integrating the elementary distances d(i, j(i))'s successively calculated only when the significant sound specifying signal M specifies the first sequence or sequences. Such a similarity measure calculating unit 26 is readily implemented by using the elementary signal or signals $m_i$'s having the value 0 as an inhibit signal.

At the end of the similarity measure calculating interval, the first address signal i is eventually made to indicate the first final count I. The register holds a modified overall distance D'(A, B) given by:

$$D'(A, B) = \sum_{i=1}^{I} m_i \| a_i - b_{j(i)} \|,$$

as a total of the elementary distances d(j))'s, each calculated between a feature vector $a_i$ in the first sequence and a feature vector $b_{j(i)}$ mapped thereto by the warping function.

Any one of the similarity measures known in the art may be substituted for the modified overall distance D'(A, B). The first sequence may now be named a first train of feature vectors. The second sequence is not used in calculating the similarity measure unless the specific speech sound is similar to the input speech sound. In the embodiment being illustrated, a sequence of feature vectors $b_{j(i)}$'s selected in synchronism with the elementary signals $m_i$'s of the value 1 from a time sequence B' derived from the specific time sequence B by the time normalization may be referred to as a second train of feature vectors. The similarity measure calculating unit 26 now calculates a similarity measure between the first and the second trains selected from the input time sequence A and the time normalized sequence B' in compliance with the single significant sound specifying signal, respectively. The similarity measure calculating unit 26 produces a similarity measure signal D representative of the calculated similarity measure. Briefly speaking, a speaker recognizing system illustrated with reference to FIGS. 1 and 2 calculates a similarity measure between a significant part of an input pattern and that part of a reference pattern which is time normalized to the significant part.

As illustrated in FIG. 2 at (a), the similarity measure calculating interval is followed by the decision interval. Responsive to the similarity measure signal D, a decision unit 27 recognizes whether or not the speaker to be recognized is the specific speaker. The decision unit 27 produces an output signal Z representative of the result of recognition.

For this purpose, the decision unit 27 compares the similarity measure with a predetermined threshold value $\theta$. If the modified overall distance D'(A, B) is used as the similarity measure, the output signal Z may be given values 1 and 0 when $$D'(A, B) \geq \theta$$

and $$D'(A, B) < \theta,$$

respectively. When given the value 1, the output signal Z indicates that the speaker to be recognized is not the specific speaker, with a Z value of 0 indicating that the speaker to be recognized is the specific speaker respectively. The threshold value $\theta$ may be predetermined between 0.3 and 0.4 when the modified overall distance D'(A, B) is normalized to take a value equal to unity for the first and the second trains representative of one and the same significant sound. It is possible to select other values for the threshold value $\theta$ depending on the circumstances by statistically analysing the results of recognition.

Figure 3:
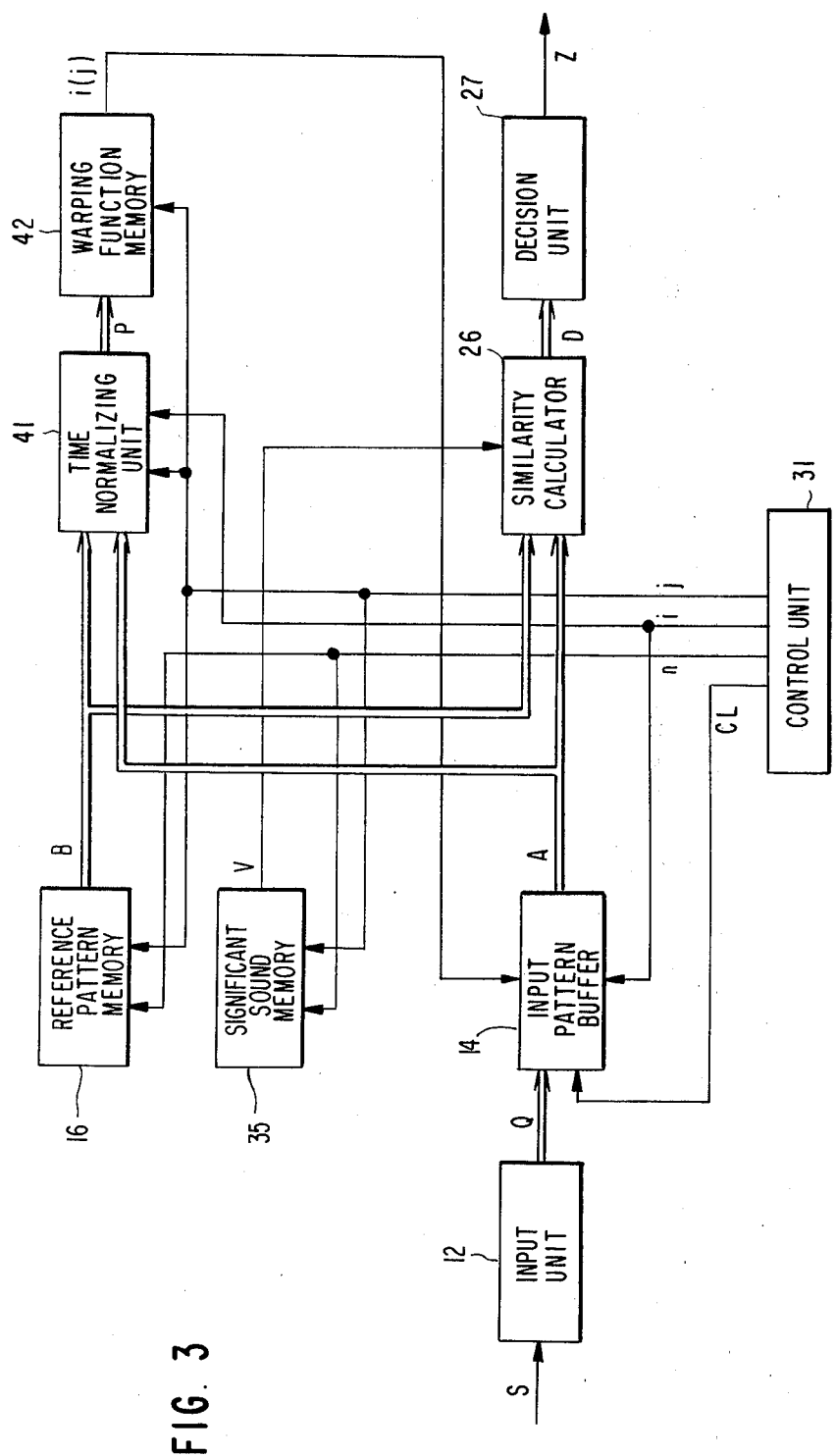
FIG. 3 is a block diagram of a speaker recognizing system according to a second embodiment of this invention.

Referring to FIG. 3, a speaker recognizing system according to a second embodiment of this invention comprises similar parts designated by like reference numerals. A slightly modified control unit 31 is substituted for the control unit 11 described in connection with FIGS. 1 and 2. In the input interval, the control unit 31 makes the first address signal i consecutively indicate the counts from unity up to the first final count I as before. During the time in which a specific sequence B is selected by the reference speech sound specifying signal n in the time normalizing interval, the control unit 31 makes the second address signal j indicate, in synchronism with certain clocks, such as the clocks CL, consecutive counts from unity up to the second final count J as mentioned hereinabove. The first address signal i is varied in a staggering manner preferably in the adjustment window for the consecutive counts j's of the second address signal j.

A significant sound specifying memory 35 is substituted for the significant sound discriminating unit 13 and the significant sound specifying buffer 15. The significant sound specifying memory 35 is for registering a plurality of registered significant sound specifying signals V's in one-to-one correspondence to the registered sequences $B^n$'s. The registered significant sound specifying signals V's are indicative of the reference sequences of the respective registered sequences $B^n$'s.

Accessed by the reference speech sound specifying signal n in the time normalizing interval, the registered sequences $B^n$'s are selected one at a time as a specific sequence B as before. One of the registered significant sound specifying signals V's that corresponds to the selected one of the registered sequences $B^n$'s, is concurrently selected as a selected significant sound specifying signal V. Controlled by the second address signal j indicative of the consecutively increasing counts, the reference pattern memory 16 delivers the selected one of the registered sequences B$^n$'s to the signal lead B as a specific time sequence B of feature vectors b$_j$'s with the reference sequence thereof produced as a second sequence. The significant sound specifying memory 35 supplies a signal lead V with the selected significant sound specifying signal V.

Each registered significant sound specifying signal V may be a sequence of elementary signals m$_j$'s given values 1 and 0 when the feature vectors b$_j$'s of a registered sequence B corresponding thereto, are representative of voiced and voiceless sounds, respectively. A time sequence of elementary signals m$_j$'s taking the value 1 is herein referred to again as a single significant sound specifying signal, which is now produced in synchronism with the second sequence of the specific time sequence B rather than with the first sequence of the input time sequence A. In this context, it is possible to say that the selected significant sound specifying signal V is produced as a single significant sound specifying signal. In any event, the elementary signals m$_j$'s are produced as an elementary signal time sequence as:

$$V = m_1, m_2, \ldots, m_j, \ldots, m_J.$$

It is possible to store the significant sound specifying signals V's in the significant sound specifying memory 35 concurrently with storage of the registered sequences B$^n$'s in the reference pattern memory 16. On so doing, a significant sound discriminator, similar in operation to the significant sound discriminating unit 13, is necessary to derive a significant sound specifying signal V from each reference speech sound n. The significant sound discriminating unit 13 must produce the significant sound specifying signal M in a real time fashion and must consequently be a high-speed and accordingly high-priced circuit. In contrast, the significant sound discriminator need not be a high-speed circuit and is readily implemented by a low-priced microcomputer. Alternatively, the elementary signals m$_j$'s of the significant sound specifying signals V's may even manually be given the values 1 and 0 and stored in the significant sound specifying memory In the time normalizing interval, the input time sequence A is time normalized by the specific time sequence B according to a warping function:

$$i = i(j),$$

for mapping the first time axis i to the second time axis j. Stated otherwise, the feature vectors a$_i$'s of the input time sequence A are mapped by the warping function to the feature vectors b$_j$'s of the specific time sequence B. A time normalizing unit 41, substituted for the circuitry 21 described in conjunction with FIGS. 1 and 2, is therefore quite similar to the circuitry 21 in principle. When elementary distances d(i(j), j)'s are used in calculating the similarity measure, the warping function is established by solving a minimization problem:

$$\min_{i(j)} \left[ \sum_{j=1}^{J} d(i(j), j) \right].$$

By way of example, the time normalizing unit 41 calculates a recurrence formula:

$$g(i, j) = d(i, j) + \min \begin{bmatrix} g(i, j-1) \\ g(i-1, j-1) \\ g(i-2, j-1) \end{bmatrix},$$

successively selecting the pointers p(i, j)'s from the values 0, 1, and 2. The warping function is established by iteratively selecting abscissae i(j)'s for consecutive ordinates j's in compliance with the pointers p(i, j)'s stored in a pointer table of the type described heretobefore. A warping function memory 42 is loaded with the abscissae i(j)'s at the addresses accessed by the second address signal j indicative of the consecutively increasing counts j = 1, 2, ..., j, ..., J as:

$$i(1), i(2), \ldots, i(j), \ldots, i(J).$$

In the similarity measure calculating interval, the second address signal j is varied once again to indicate the consecutively increasing counts from unity up to the second final count J. The warping function memory 42 delivers the abscissae i(j)'s to the input pattern buffer 14 through a signal lead i(j). The abscissae i(j)'s are used in accessing, in place of the first address signal i used in the input interval, the addresses of the input pattern buffer 14. Inasmuch as the first address signal i and the abscissae i(j)'s may be supplied to the input pattern buffer 14 through an OR gate (not shown), it is possible to understand that the buffer 14 depicted in FIG. 3 is not different from that illustrated in FIG. 1. The input pattern buffer 14 supplies the similarity measure calculating unit 26 through the signal lead A with selected feature vectors a$_{i(j)}$'s of the input time sequence A from the addresses successively accessed by the abscissae i(j)'s. The selected feature vectors a$_{i(j)}$'s define a time sequence A′ derived from the input time sequence A by the time normalization under consideration. The time sequence A′ may be called a first normalized time sequence. In harmony therewith, the time sequence B′ derived from the specific time sequence B as described in conjunction with FIGS. 1 and 2, may be named a second normalized time sequence.

The reference pattern memory 16 supplies the consecutive feature vectors b$_j$'s of the specific time sequence B to the similarity measure calculating unit 26 through the signal lead B. The significant sound specifying memory 35 supplies the similarity measure calculating unit 26 with consecutive elementary signals m$_j$'s through the signal lead V in synchronism with the feature vectors b$_j$'s of the specific time sequence B. The similarity measure calculating unit 26 calculates the elementary distance d(i(j), j) between each feature vector b$_j$ and the feature vector a$_{i(j)}$ mapped thereto and does not when the significant sound specifying signal V has the values m$_j$ = 1 and m$_j$ = 0, respectively.

At the end of the similarity measure calculating interval, the second address signal j eventually indicates the second final count J. The register in the similarity measure calculating unit 26 holds a modified overall distance D″(A, B) given by:

$$D''(A, B) = \sum_{j=1}^{J} m_j \| a_{i(j)} - b_j \|,$$

for elementary signals m$_j$'s taking the value 1.

For unity of understanding, it is now possible to say that the second train of feature vectors is given by those of the consecutive feature vectors $b_j$'s which are selected from the second normalized time sequence B' in synchronism with the single significant sound specifying signal or signals given by the elementary signals $m_j$'s of the value 1. The first train of feature vectors is given by those of the selected feature vectors $a_{i(j)}$'s which are further selected from the first normalized time sequence A' in synchronism with the significant sound specifying signal or signals. The similarity measure calculating unit 26 calculates a similarity measure between the first and the second trains selected from the first and the second normalized time sequences A' and B' in compliance with the significant sound specifying signal or signals, respectively.

As before, the similarity measure calculating unit 26 produces a similarity measure signal D representative of the calculated similarity measure. Responsive to the similarity measure signal D, the decision unit 27 produces in the decision interval the output signal Z of the type described above.

While a few preferred embodiments of this invention have thus far been described, it will now readily be feasible for one skilled in the art to put this invention into effect in various other ways. For example, the time normalization may be carried out in the input interval by a system of the type illustrated with reference to FIGS. 1 and 2. With a system of the type illustrated with reference to FIG. 3, the time normalization may be carried out as soon as a certain number of feature vectors $a_i$'s of the input time sequence A are stored in the input pattern buffer 14 as pointed out in the above-referenced U.S. Pat. No. 4,049,913. The time normalizing unit 21 or 41 may establish first and second warping functions for mapping the feature vectors $a_i$'s of the input time sequence A and the feature vectors $b_j$'s of the specific time sequence B to a certain time sequence of feature vectors $c_1$ through $c_K$, respectively, according to a symmetric warping algorithm described in the Sakoe et al article rather than according to an asymmetric warping technique defined by Sakoe et al and described hereinabove. The first and the second normalized time sequences will become quite meaningful under the circumstances. The significant sound may be given by nasal vowels and/or consonants. When the ambient noise is considerably large, the significant sound may be a sound having an amplitude exceeding a threshold value that should be determined in consideration of the noise and dependent on statistical analysis of the results of recognition. In this manner, the significant sound has a predetermined nature, which is informative of speakers as pointed out heretofore. Even in this event, it is readily possible to implement a significant sound discriminating unit as described hereinabove for use either in a speaker recognizing system of the type illustrated with reference to FIG. 1 or in storing the significant sound specifying signals in the significant sound specifying memory described in conjunction with FIG. 3.

What is claimed is:

1. A speaker recognizing system comprising:
input time sequence producing means responsive to an input speech sound, spoken by a speaker to be recognized and comprising a significant sound of a predetermined nature informative of said speaker, for producing an input time sequence of feature vectors representative of said input speech sound;
significant sound specifying means responsive to said input speech sound for producing a sound nature signal which comprises a significant sound signal specifying said significant sound;
specific time sequence producing means for producing a specific time sequence of feature vectors representative of a specific speech sound spoken by a specific speaker, said specific speech sound comprising a significant sound informative of said specific speaker;
time normalizing means for time normalizing said input time sequence and said specific time sequences relative to each other to derive first and second normalized time sequences of feature vectors from said input time sequence and said specific time sequence, respectively;
similarity measure calculating means responsive to said sound nature signal and said first and said second normalized time sequences for calculating a similarity measure between those feature vectors of said normalized time sequences of feature vectors which are selected from said first and said second normalized time sequences in compliance with said significant sound signal, respectively, said similarity measure calculating means producing a similarity measure signal representative of the calculated similarity measure; and
means responsive to said similarity measure signal for recognizing whether or not the speaker to be recognized is said specific speaker.

2. A speaker recognizing system as claimed in claim 1, wherein said specific time sequence producing means comprises:
means for storing a plurality of stored sequences of feature vectors representative of reference speech sounds spoken by a plurality of registered speakers, each reference speech sound comprising a significant sound informative of the speaker by whom said each reference speech sound is spoken; and
sequence selecting means for selecting one of said stored sequence at a time to produce the selected one of said stored sequences as said specific time sequence, said specific speaker being that one of said registered speakers by whom the reference speech sound represented by said selected one of the stored sequences is spoken.

3. A speaker recognizing system comprising:
specific time sequence producing means for producing a specific time sequence of feature vectors representative of a specific speech sound spoken by a specific speaker, said specific speech sound comprising a significant sound of a predetermined nature informative of said specific speaker;
significant sound specifying means for producing a sound nature signal which comprises a significant sound signal specifying said significant sound;
input time sequence producing means responsive to an input speech sound spoken by a speaker to be recognized and comprising a significant sound informative of the speaker to be recognized for producing an input time sequence of feature vectors representative of said input speech sound;
time normalizing means for time normalizing said input and said specific time sequences relative to each other to derive first and second normalized time sequences of feature vectors from said input and said specific time sequences, respectively, to produce said first and said second normalized time sequences;

similarity measure calculating means responsive to said sound nature signal and said first and said second normalized time sequences for calculating a similarity measure between those feature vectors of said first and second normalized time sequences of feature vectors which are selected from said first and said second normalized time sequences in compliance with said significant sound signal, respectively, said similarity measure calculating means producing a similarity measure signal representative of the calculated similarity measure; and means responsive to said similarity measure signal for recognizing whether or not the speaker to be recognized is said specific speaker.

4. A speaker recognizing system as claimed in claim 3, wherein said specific time sequence producing means comprises:

means for storing a plurality of stored sequences of feature vectors representative of reference speech sounds spoken by a plurality of registered speakers, each reference speech sound comprising a significant sound of a predetermined nature informative of the speaker by whom said each reference speech sound is spoken; and sequence selecting means for selecting one of said stored sequences at a time to produce the selected one of said stored sequences as said specific time sequence, said specific speaker being that one of said registered speakers by whom the reference speech sound represented by said selected one of the stored sequences is spoken;

said significant sound specifying means comprising: means for storing a plurality of stored nature signals in one-to-one correspondence to said stored sequences, each stored nature signal comprising a second sound signal specifying the significant sound of the reference speech sound represented by the stored sequence corresponding to said each stored nature signal; and means operatively coupled to said sequence selecting means for selecting that one of said stored nature signals which corresponds to said specific time sequence, said significant sound specifying signal being the stored sound signal of the selected one of said stored nature signals.

* * * * *

UNITED STATES PATENT AND TRADEMARK OFFICE
CERTIFICATE OF CORRECTION

PATENT NO. : 4,403,114
DATED : September 6, 1983
INVENTOR(S) : Hiroaki Sakoe

It is certified that error appears in the above-identified patent and that said Letters Patent is hereby corrected as shown below:

Column 9, line 8, delete "unit" and insert --unity--.

Column 9, line 40, delete "d(j))'s" and insert --d(i, j(i))'s--.

Column 11, line 44 "after memory" insert --35--.

Column 16, line 14, delete "second" and insert --stored--.

Signed and Sealed this

Sixth Day of March 1984

[SEAL]

Attest:

Attesting Officer

GERALD J. MOSSINGHOFF

Commissioner of Patents and Trademarks